United States Patent [19]

Graham

[11] 4,234,639
[45] Nov. 18, 1980

[54] INTUMESCABLE FIRE-RETARDANT PRODUCTS

[75] Inventor: Joseph Graham, Oakdale, Minn.

[73] Assignee: Minnesota Mining and Manufacturing Company, Saint Paul, Minn.

[21] Appl. No.: 59,614

[22] Filed: Jul. 23, 1979

[51] Int. Cl.² .................. B32B 11/02; B32B 5/30
[52] U.S. Cl. .................. 428/144; 106/18.12; 106/18.35; 252/8.1; 427/186; 427/220; 428/308; 428/403; 428/920; 428/921; 428/484
[58] Field of Search .............. 428/141, 144, 149, 308, 428/403, 404, 406, 920, 921, 484; 427/214, 186, 220; 106/18.12, 18.35; 252/8.1

[56] References Cited

U.S. PATENT DOCUMENTS

| | | | |
|---|---|---|---|
| 2,718,479 | 9/1955 | Bierly | 428/921 |
| 2,782,129 | 2/1957 | Donegan | 117/30 |
| 3,216,883 | 11/1965 | Bick et al. | 161/163 |
| 3,332,830 | 7/1967 | Tomlinson et al. | 161/83 |
| 3,365,322 | 1/1968 | Hinds | 117/30 |

FOREIGN PATENT DOCUMENTS 1300937 12/1972 United Kingdom.
1457999 12/1976 United Kingdom.

*Primary Examiner*—Paul J. Thibodeau
*Attorney, Agent, or Firm*—Cruzan Alexander; Donald M. Sell; Roger R. Tamte

[57] ABSTRACT

Fire-retardant granules comprise (1) core particles of hydrated soluble silicate glass that intumesces in the presence of heat, and (2) a solid coating around the core particles that comprises a mixture of (a) halogenated organic compound that releases halogen when heated to a temperature less than about 250° C.; and (b) an iron-containing compound adapted to react with said released halogen to form iron halide. The combined intumescence of the core particle and the catalytic effect of the coating on the particle achieves a unique fire-retarding action, especially in asphalt products such as asphalt shingles, but also in a range of other products.

13 Claims, 3 Drawing Figures

INTUMESCABLE FIRE-RETARDANT PRODUCTS

The present invention provides a granular additive than can be incorporated into asphalt shingles in low, commercially practicable amounts, with no significant modification of existing shingle manufacturing procedures, to convert the shingles from a flammable form (typically rated Class C by Underwriter's Laboratory tests) to a fire-retardant (Class A) form. The granules of the invention are also useful as a fire-retardant additive in other products.

Prior-art efforts have never produced a successful fire-retardant asphalt-impregnated rag-felt shingle. Some success has been achieved with fire-retardant glass-fiber-based shingles, but the expense of such shingles, their brittleness in cold weather and limpness in hot weather, and their sometimes marginal fire protection (e.g., some pass the required tests for a Class A rating only on thick wood decking, not on the thinner decking that is required for a full unrestricted Class A rating) has limited their use. Other approaches tried either alone or in combination with glass fibers—inclusion of chemical fire-retardant agents, use of extra or heavier layers of roofing granules, and/or use of intumescable additives (see Donegan, U.S. Pat. No. 2,782,129; Hinds, U.S. Pat. No. 3,365,322; and Bick et al., U.S. Pat. No. 3,216,883, for teachings of intumescable additives)—move even further from commercial acceptance.

A start on a low-cost fire-retardant asphalt shingle is taught in pending application, Ser. No. 916,941, filed June 19, 1978 (filed as a continuation-in-part of an earlier application, Ser. No. 814,493, filed July 11, 1977). This earlier application teaches novel intumescable hydrated soluble silicate particles and asphalt shingles and other articles incorporating such particles. The particles intumesce in large volumes at useful temperatures, and shingles made from the particles pass most of the tests needed to qualify for a Class A Underwriter's Laboratory fire rating. However, the shingles do not reliably pass "spread of flame" tests, unless made in certain forms that are not universally desired, such as with glass-fiber mats or with glass fibers dispersed in the asphalt. While the novel particles are quite useful as a fire-retardant additive in many articles, and are a vast improvement over any previous intumescable additive for asphalt shingles, they have not brought the art to the widely useful fire-retardant asphalt shingles that are a goal for the shingle industry.

SUMMARY OF THE INVENTION

In brief summary, the present invention provides fire-retardant granules that comprise (1) core particles comprising hydrated soluble silicate glass that intumesces in the presence of heat, and (2) a coating around the core particles comprising a mixture of (a) halogenated organic compound that releases halogen when heated to a temperature less than about 250° C.; and (b) an iron-containing compound adapted to react with the released halogen to form iron halide.

Such granules are effective as a fire retardant in a variety of articles made from a variety of chemical classes of materials; but an immediate important potential use for the granules is as a fire retardant for asphalt-based articles such as asphalt shingles. When granules of the invention are mixed in asphalt and the mixture exposed to fire, the granules intumesce and cause the mixture to bubble up and expand. At the same time, an exterior layer of asphalt in the expanded mixture rapidly chars, presumably as a result of catalytic action by the reaction product of the iron-containing compound and halogen. The charred, intumesced asphalt is rigid and fire resistant, and it limits flaming of underlying asphalt and the flow of asphalt that promotes spreading of a flame.

The invention makes possible for the first time, insofar as known, a moderate-cost fire-retardant rag-felt asphalt shingle. As an example, Class C rag-felt asphalt shingles modified simply by cascading a spare monolayer of granules of the invention into the shingle at an intermediate stage of manufacture, without any other change in the shingle, have passed all tests needed to qualify the shingle as Class A in fire resistance. Rag-felt shingles have been a basic staple in residential roofing, and the availability of a fire-retardant form should expand the usage of fire-retardant roofing. The invention also makes glass-fiber-based asphalt shingles more fire retardant and can be useful to reduce present limitations on the use of such shingles.

In addition, as noted above, granules of the invention are useful as a fire-retardant additive in many other products, such as polyurethane foams; and the granules make possible new forms of fire-resisting products, such as expansible asphalt pads or polyvinyl chloride sheets useful in building construction as fire barriers for openings through walls or floors.

ADDITIONAL PRIOR ART

The effect of ferric chloride as a catalyst for oxidizing asphalt has been known for many years, and has been made use of to reduce the time of air-blowing processes of treating petroleum to prepare asphalt. Some catalyst typically remains unused at the end of the asphalt-manufacturing process, and Tomlinson et al, U.S. Pat. No. 3,332,830 teaches that this retained catalyst is useful to improve the fire-resisting capability of asphalt-impregnated sheeting made from the catalyzed asphalt. Tomlinson et al incorporate this catalyzed asphalt into sheeting made from a mineral fiber mat, and concentrations of chopped strands or bundles of fibers are also incorporated at the edges of the sheeting. The patent states that the combination of the catalytic activity of the residue ferric chloride, the stability introduced by the mineral fiber network, and the plugging of the exposed edges of the product reduces the spread of flame of the product.

There are also teachings in the art as to the use of halogenated compounds and ferric oxide as fire-retardant additives in roofing. British Pat. Nos. 1,300,937 and 1,457,999 teach compositions for use in impregnating or coating roofing felts to produce a roofing material which comprise bitumen, pitch or asphalt, a halogen donor, and a finely divided material that consists of aluminum-iron silicates and/or ferric oxide, and/or in the case of the '999 patent, carbon black. The halogen donor evolves halogen or hydrogen halide and may be selected from chlorinated rubber and alkyl benzenes containing two or more chlorine and/or bromine atoms as nuclear substituents. The compositions include 1 to 50, preferably 4 to 10, parts of halogen donor, and 6 to 20, preferably 8 to 15, parts of ferric oxide per 100 parts of bitumen, pitch or asphalt. The finely divided ferric oxide is regarded as activating or reacting with the halogen donor to enhance the release of halogen or halogen halide when the composition is exposed to a flame.

None of these prior patents teaches an additive like the granules of the present invention, nor do the teachings in any of these patents achieve the results achieved by granules of the invention. Granules of the present invention involve a combined effect of intumescence and catalytic activity, and the prior patents not only do not teach the intumescable core particles used in granules of the invention, they also do not predict the benefit of combined intumescence and catalytic activity.

Furthermore, the catalytic activity of granules of the invention is achieved even though the catalytic ingredients are concentrated in a granular additive (instead of being dispersed in the asphalt as in the prior art, which causes a thickening of the asphalt that may limit its application properties); and the catalytic ingredients are used in significantly lower amounts, which promote commercial practicality for granules of the invention, than are used for example in the British patents. Despite this concentration and the lower amounts of catalytic ingredients, granules of the invention are effective, even when added as a layer intermediate other layers of an asphalt shingle (rather than being dispersed throughout the asphalt layers), to achieve a result that, as noted above, has never before been achieved, i.e., to provide moderate-cost fire-retardant rag-felt asphalt shingles, as well as many other useful products.

DETAILED DESCRIPTION

Figure 1:
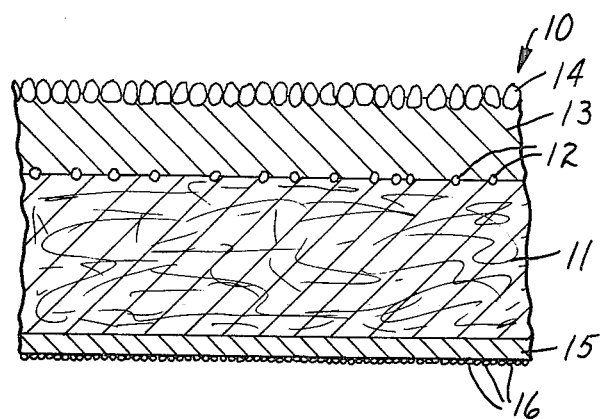
FIG. 1 is a sectional view through an illustrative asphalt shingle 10 of the invention, which comprises felt paper 11 impregnated with an asphaltic composition; a sparse monolayer of catalytic, intumescable soluble silicate granules 12, cascaded onto the impregnated felt during manufacture of the shingle; a layer 13 of asphaltic composition filled with typically 50–60 percent of a particulate filler such as limestone applied over the granules 12; roofing granules 14 cascaded onto and partially embedded in the layer 13; a back coating 15 of asphaltic composition applied to the bottom of the felt paper 11; and a dust coating 16 of mica or the like applied to make the back side of the material tack-free.
Figure 2:
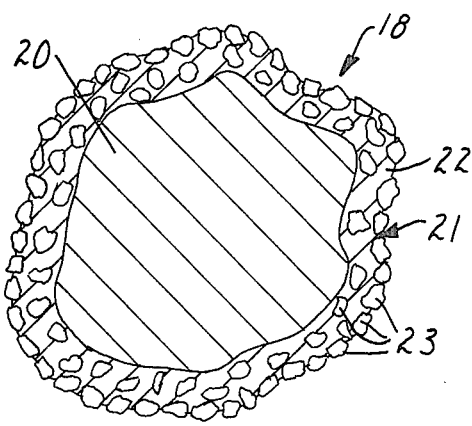
FIGS. 2 and 3 are sectional views through representative catalytic, intumescable granules 18 and 19 of the invention. The granule 18 shown in FIG. 2 comprises a core particle 20 and a catalytic coating 21, which in this illustrative granule may comprise a layer 22 of halogenated compound and particles 23 of iron-containing compound dispersed in the halogenated compound. The granule 19 shown in FIG. 3 comprises a core particle 24, a protective coating 25 of the type taught in earlier application, Ser. No. 916,941, and a catalytic coating 26 applied over the coating 25.
Figure 3:
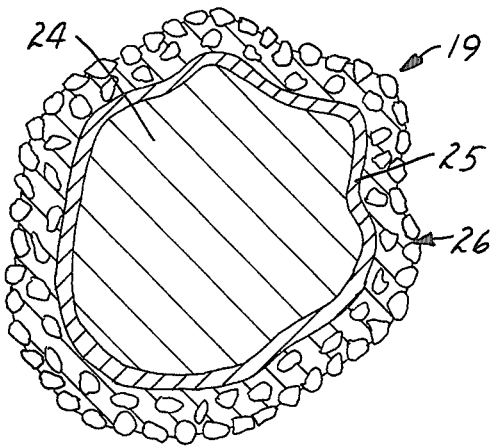

Sodium silicates are preferred as the soluble silicate glass in catalytic intumescable granules of the invention because of their lower cost; but silicates formed from other alkali metals may also be used, including, for example, those formed from potassium and lithium. The silicates used may also have different ratios of silica to alkali-metal oxide, but silicates having a ratio above about 2 to 1 are preferred because they are less water-soluble than those of lesser ratios.

TABLE I

Volume Intumescence of Sodium Silicate Particles ($SiO_2$; $Na_2O$ ratio of 3.22, and hydrated with 13 percent water)

| Particle Size | | Volume to which two-milliliter sample expands (milliliters) |
|---|---|---|
| Range of size (micrometers) | Average diameter (micrometers) | |
| 2000–2380 | 2200 | 200 |
| 840–2000 | 1400 | 200 |
| 590–840 | 710 | 175 |
| 420–590 | 500 | 175 |
| 297–420 | 350 | 160 |
| 176–297 | 230 | 125 |
| 125–176 | 150 | 110 |
| 88–127 | 105 | 90 |
| 70–88 | 80 | 80 |
| 62–74 | 67 | 70 |
| 44–62 | 53 | 50 |
| ~40 | 28 | 25 |
| ~20 | 14 | 3 |
| ~10 | 6 | 3 |

The catalytic intumescable granules can range widely in size, though as shown in Table I, volume of intumescence varies with the size of the core particles in the granules. As the core particle size reported in the table rises above minimal values, the volume of intumescence increases significantly; the reported particles that average approximately 25 micrometers in size intumesce over 10-fold; and the reported particles that average approximately 100 micrometers, intumesce over 40-fold. Granules of the invention should intumesce at least 4-fold, and for most uses at least 25-fold and preferably at least 40-fold. For the highest volume-percent of intumescence, core particles above about 300 micrometers in diameter are preferably used (in giving values for maximum and minimum diameter, the values stated apply for only 90 volume-percent of the particles, since after a screening operation some of the remaining particles are outside the screen sizes). For the most satisfactory use in roofing material the core particles should average less than 2 millimeters, and preferably less than 1 millimeter in diameter. However, finished granules up to several centimeters in diameter can also be used for special purposes.

The core particles will intumesce in different amounts depending on the amount of water present. To obtain a useful amount of intumescence the soluble silicate should generally include at least 3 percent, and preferably at least 10 percent, water. Peak intumescene for typical sodium silicates occurs at around 15 percent water. With greater amounts of water beyond 15 percent, intumescence declines, though it will occur for contents of water up to, and in fact beyond, the point (about 30 percent) at which the soluble silicate dissolves in water. Typically, no significant benefits are obtained by including more than 20 percent water.

Whereas the core particle in granules of the invention can be quite soluble in water, for most uses the particles should be of limited solubility in water. Such a limited solubility can be achieved by use of a protective coating such as described in previous application, Ser. No. 916,941, filed June 19, 1978, and its parent application, Ser. No. 814,493, filed July 11, 1977. Such coatings include an ingredient that is ionized in the presence of water to provide metal cation capable of reacting with the silicate ion of the core particle. The reaction between the metal and silicate ions forms a reaction product that is less water-soluble than the core particle, whereby a protective layer is formed around the particle. The protective coating is regarded as having a self-healing function, in that any openings which develop in the protective layer tend to be sealed, thereby limiting action of water on the core particles and maintaining the intumescent character of the particles.

The preferred protective coating, providing the longest lasting and most thorough moisture protection comprises a metal salt of a long-chain fatty acid. Stearic acid is the preferred long-chain fatty acid, but others such as oleic or palmitic acid, can also be used. Calcium is the preferred metal in the protective coating, though other metals such as the alkaline-earth metals barium and magnesium, and aluminum and zinc, can be used. Additional details of the protective coatings are available in preceding application, Ser. No. 916,941, or in such foreign counterparts to that application as U.K. Patent Application GB No. 2,000,696, published Jan. 17, 1979, under early-publication procedures.

The catalytic coating on a particle of the invention can also provide protection against solution of the core particle, since the coating can be of water-impermeable ingredients.

Useful halogen donors for inclusion in catalytic coatings in granules of the invention comprise organic compounds in which halogen constitutes a substantial proportion, generally at least 40 weight-percent, of the compound, and in which halogen, e.g., halogen vapor or hydrogen halide, evolves from the compound when the compound is heated to a temperature less than 250° C. Useful examples of halogen donors include halogenated paraffins and unstable forms of polyvinyl chloride and polyvinylidene chloride (instability can be achieved by omission of conventional stabilizers or by inclusion of materials like zinc compounds which promote decomposition).

Halogen donors are conveniently incorporated in granules of the invention by coating them from solution or from a dispersion onto the core particles, or by coating liquid forms of the compound. Alternatively, core particles may be coated with a binder material such as polyethylene or asphalt, and while the binder material is tacky as by heating, tumbled in halogenated compound. The latter becomes coated on the binder material and may in fact dissolve into the binder material.

The preferred iron-containing compounds for inclusion in the catalytic coating of a granule of the invention are iron oxide particles, i.e., particles of FeO, $Fe_2O_3$, or $Fe_3O_4$. Magnetic iron oxides have the advantage that magnetic forces can be used to hold cascaded granules of the invention in place on a roofing felt or other substrate, e.g., by placing a magnet under the felt, during manufacture of roofing or other products. Iron oxide particles can be incorporated in the coating by dispersing them in the halogenated compound or some other binder material coated on the particles, or by tumbling a tacky-coated core particle in a bed of iron oxide particles. The particles become adhered and partially or fully embedded in the coating; and a surface layer is typically formed which detackifies the granule.

Other useful iron-containing compounds include iron salts of a fatty acid such as stearic or oleic acid. In one embodiment, such compounds are formed in situ on the granule by applying a coating of the molten acid on the particles and tumbling the coated particles in a bed of iron oxide particles, which become embedded in the coating and react to form the iron salt. Thereafter, the particles may be coated with a halogenated compound such as chlorinated paraffin, and if desired, additional iron oxide particles can be coated on the exterior surface as a detackifier. Other useful iron-containing compounds may generally be chosen by heating a mixture of asphalt, chlorinated paraffin and the candidate material for 1 hour at 350° F.; if the ring-and-ball softening point of the mixture is significantly higher after this test than the ring-and-ball softening point for the asphalt itself, the iron-containing compound will generally produce a useful catalytic effect in granules of the invention.

For most uses of catalytic intumescable granules of the invention, sufficient halogen donor is included to provide at least 1 or 2 weight-parts of halogen, and preferably at least 3 or 4 parts of halogen, per 100 parts of soluble silicate. It will seldom be useful to use more than 20 weight-parts of halogenated compound per 100 parts of soluble silicate. Sufficient iron-containing compound is included to react with the released halogen to form catalytic iron halide and also in some cases to detackify the particles. Generally at least 1, and preferably at least 5 or 10 weight-parts of iron oxide (the various forms of which have specific gravities of over 5 in comparison to a specific gravity of typical sodium silicate of about 2.2) are used per 100 weight-parts of soluble silicate. Practically speaking, it is usually impractical to use more than 100 parts of iron-containing compounds per 100 parts of silicate.

The completed granules of the invention can be used in a variety of articles or compositions, and in varying amounts depending upon the kind of article or composition and the degree of fire protection or other properties desired. In rag-felt asphalt shingles at least 4 kilograms per 10-by-10-meter section of applied roofing (2 pounds per 100 square feet of applied roofing) is generally used to achieve a Class A rating; and for glass-fiber-mat-based shingles, at least 1 or 2 kilograms per 10-by-10-meter section of applied roofing is generally used to achieve such a rating. There is hardly ever any need for more than 20 kilograms of granules of the invention per 10-by-10-meter section of applied roofing.

Granules of the invention may also be used as a fire-retardant additive in built-up or roll roofing, e.g., by cascading granules between layers of asphalt applied to form the roofing or by including the granules in a top sheeting incorporated into the roofing. Granules of the invention are also useful in other asphalt-impregnated sheetings, for example, as a coating on asphalt-impregnated rag-felt or glass-fiber mat, which can be laminated to fibrous or foam insulation as a moisture barrier.

Other uses for granules of the invention include dispersion in asphalt pads or polyvinyl chloride sheets, which may be used as fire barriers in electrical junction boxes or in "poke-through" devices or cable-penetration devices in building floors or walls. A wide range of amounts of granules may be included in such products, though most often 10 to 300 weight-parts of granules of the invention are mixed in 100 parts of asphalt or polyvinylchloride. Granules of the invention are also useful as fire-retardant additives in other resin systems, such as polyurethane foams and polyester casting resins.

The combination of halogenated paraffin, particularly chlorinated paraffins and iron oxide, is particularly useful, and in fact granulated combinations of halogenated paraffins and iron oxide without intumescable core particles may be used as a convenient additive for mixing with asphalt, for example, to thicken it or catalyze charring.

The invention will be further illustrated by the following examples (in which parts are by weight unless otherwise stated):

EXAMPLE 1

One-hundred parts of anhydrous sodium silicate glass particles having a $SiO_2:Na_2O$ ratio of 3.22 and a range in size from about 300 to 840 micrometers were heated in an oven to 250° F. (120° C.). The particles were then dumped into a cement mixer and 2 parts of powdered stearic acid added, whereupon the stearic acid melted and became coated on the particles. After the mixing had continued for about 10 minutes, 20 parts of calcium hydroxide were added and the mixing continued for an additional 10 minutes. Next 1 part of a silicone water repellant (DC-772 Sodium Siliconate from Dow Corning) was added and mixed in for 10 minutes.

Thereupon the coated particles were placed in a rotary autoclave where they were hydrated at a steam temperature of 285° F. (140° C.) for 2 hours. After removal from the autoclave, the particles were free-flowing, had a water content of about 10 weight-percent, and expanded about 50-fold upon heating to 300° C.

One-hundred parts of the coated sodium silicate particles as described, in unexpanded form, were charged to a ribbon blender. Separately, 7 parts of chlorinated paraffin containing approximately 70 weight-percent chlorine (Chlorowax 70 supplied by Diamond-Shamrock Corporation) were slowly added to 10 parts of 1,1,1 trichloroethane, under vigorous agitation. The resulting solution was added to the ribbon blender and mixed with the sodium silicate core particles for about 5 minutes. Thirty-five parts of $Fe_2O_3$ particles less than about 75 micrometers in diameter were then added to the blender, and all the contents mixed together until uniform in color. At that point, individual granules had separated, which individually comprised a core particle coated with an underlying coating of the stearic acid-calcium stearate-calcium hydroxide layer and an outer coating of chlorinated paraffin, with iron oxide particles partially embedded in the paraffin so as to essentially form the outer surface of the granules. One part of a low-viscosity paraffinic oil and 1 part of a silicone sizing oil were added to the granules to improve the compatibility of the granules with asphalt. The granules were heated to 170° F. to remove solvent, and swept with a stream of air until all the solvent has been removed, leaving a free-flowing mass of granules.

The granules were incorporated into a standard rag-felt asphalt roofing shingle material of the type shown in FIG. 1. The weight amounts of the components in the shingle material were as follows: granules 12, 6 kilograms per 10-by-10-meter section of applied roofing; layer 13 of filled asphalt, 160 kilograms per 10-by-10-meter section of applied roofing; and roofing granules of layer 14, about 160 kilograms per 10-by-10-meter section of applied roofing.

Roofing shingles were cut from the material and tested using Underwriter's Laboratory's "burning brand," "intermittent flame," and "spread of flame" tests (UL Test Procedure 790) for roof-covering materials. The shingles passed all tests on ⅜-inch-thick (approximately 1-centimeter-thick) plywood decking entitling them to an unrestricted Class A rating for fire resistance.

The prepared roofing shingles were compared with test shingles to illustrate the effects achieved by the invention. One comparative test shingle was like the roofing shingle of this example except that the core particle in the granules incorporated into the shingle was a non-intumescable quartz rock particle. Another comparative test shingle differed from the roofing shingle of this example in that the chlorinated paraffin and iron oxide coating was omitted. Both of these comparative test shingles failed a simulated "spread of flame" test, which shingles of the example pass.

EXAMPLE 2

One-hundred parts of catalytic intumescable granules prepared in the manner described in Example 1 were stirred into 100 parts of molten asphalt, and the mixture coated onto an asphalt-saturated sheet as a 5-millimeter-thick pad. When this pad was tested in Underwriter's Laboratory's E119 Building Constructions and Materials Test by placing the pad in an electrical junction box positioned on a steel flooring, with 4 inches of concrete on top of the flooring and surrounding the box, and the bottom of the flooring heated in the prescribed manner, the pad expanded and maintained a lower temperature above the pad than was measured above the concrete.

EXAMPLE 3

A polyurethane-foaming mixture was prepared from 100 parts of polyether polyol containing a fluorocarbon blowing agent (Stepan R247 supplied by Stepan Chemical Co.) and 100 parts of polymeric isocyanate (Mondur MRS supplied by Mobay). Twenty-five parts of granules as described in Example 1 were added to the mixture, which was then cured to a rigid, 2-pounds-per-cubic-foot density, foamed slab. Test samples, 0.5 inch, by 2 inches, by 6 inches, cut from the slab and conditioned in a controlled humidity environment were tested in the Mobil 45° burn test. In this test, the samples are burned on one corner with a microburner for a prescribed length of time while the samples are mounted at a 45° angle, with the large-area faces of the test samples vertical. The test samples were weighed before and after the burning test, and exhibited a 10 percent weight loss. As a comparison, a polyurethane foam like that of this example except for omission of granules of the invention exhibits an 88 percent weight loss at the end of the test.

EXAMPLE 4

One-hundred parts of a semirigid extrusion-grade polyvinyl chloride powder and 30 parts of the granules of Example 1 were mixed, heated to melt the polyvinyl chloride, and extruded into a sheet about 1/16 inch (slightly over 1.5 millimeters) thick. When laid on a hot plate heated to about 1000° F., the sheet expanded to between about ½ and ¾ inch. The sheet is useful as an expansible fire barrier, as are other sheet materials comprising granules of the invention dispersed in a binder material that softens in the presence of heat.

What is claimed is:

1. Fire-retardant granules comprising (1) core particles that comprise hydrated soluble silicate glass that intumesces in the presence of heat, and (2) a coating on the core particles comprising a mixture of (a) halogenated organic compound that releases halogen when heated to a temperature less than about 250° C.; and (b) an iron-containing compound adapted to react with said released halogen to form iron halide, whereby when said granules are mixed into asphalt and the asphalt exposed to a flame, charring of an exterior layer of the asphalt is catalyzed to limit flaming and flow of the asphalt.

2. Granules of claim 1 in which said halogenated compound is a halogenated paraffin.

3. Granules of claim 1 or 2 in which said iron-containing compound is iron oxide.

4. Granules of claim 1 in which said iron-containing compound is a salt of a long-chain fatty acid.

5. Granules of claim 1 in which halogen is present in an amount of at least about 1 weight-part per 100 weight-parts of hydrated soluble silicate.

6. Granules of claim 1 or 5 in which iron oxide is present in an amount of at least about 1 weight-part per 100 parts of hydrated soluble silicate.

7. Granules of claim 1 in which said core particles carry a protective moisture-resistant coating that includes an ingredient that is ionized in the presence of water to provide metal cation capable of reacting with the silicate ion of the core particle to form a reaction product that is less water soluble than the silicate glass of the core particle, thereby limiting action of water on the core particle.

8. Granules of claim 7 in which said protective moisture-resistant coating comprises calcium hydroxide.

9. Roofing material comprising in parallel layers, a roofing felt; at least one asphalt coating disposed above the felt; a layer of roofing granules partially embedded in the top asphalt coating in the roofing material; and a layer of the catalytic intumescable granules of claim 1 disposed within the roofing material.

10. Sheet material useful as an expansible fire barrier comprising a binder material that softens in the presence of heat and the granules of claim 1 dispersed in the binder material.

11. Sheet material of claim 10 in which said binder material is asphalt.

12. Sheet material of claim 10 in which said binder material is polyvinyl chloride.

13. Polyurethane-based foam in which granules of claim 1 are dispersed.

* * * * *